Jan. 21, 1969  JUNICHIRO SATO  3,422,645
LATCH MECHANISM

Filed March 14, 1967  Sheet 1 of 2

INVENTOR.
JUNICHIRO SATO
BY Marglow and Toren
ATTORNEYS

Jan. 21, 1969  JUNICHIRO SATO  3,422,645
LATCH MECHANISM

Filed March 14, 1967  Sheet 2 of 2

INVENTOR.
JUNICHIRO SATO
BY
ATTORNEYS

United States Patent Office 3,422,645
Patented Jan. 21, 1969

3,422,645
LATCH MECHANISM
Junichiro Sato, Kawasaki, Japan, assignor to Hideyoshi Hisatsune, Minato-ku, Tokyo, Japan
Filed Mar. 14, 1967, Ser. No. 623,114
U.S. Cl. 70—145
Int. Cl. E05b 55/06, 63/22; E05c 1/14
4 Claims

ABSTRACT OF THE DISCLOSURE

A latch mechanism adapted especially for use with doors and so made that an actuating rod mounted inside a spindle is operated directly or through the medium of said spindle to turn a cam fitted to said rod, and that an element of the coupling device operatively connecting the rod and a latch is slidingly engaged by said cam so as to be projected from or receded into the spindle through an opening provided on the cylindrical wall of the spindle with movement of said cam thereby to be engaged with or detached from the other element of said coupling device to open or close the lock.

*Brief disclosure of the invention*

Heretofore, in latch mechanisms such as night latches or button locks, problems were encountered due to their fragile structure in spite of their various conveniences. In the case of a cylinder lock, for instance, its knob housing the cylinder member in itself had to be constructed with sufficient rigidity, and it was a necessity to secure the knob to the spindle rigidly so as to be capable of withstanding strong torsional moment applied to said knob when the lock is operated.

Furthermore, in the latch mechanisms of the conventional type wherein lock members were accommodated inside the knob or the coupling device operatively connecting the latch with the latch actuating element such as a spindle provided with knobs was engaged at all times with the spindle, deficiencies were caused that the lock could easily be opened by destruction of the knob or by applying a strong torque to the spindle.

Hence, an object of the present invention is to provide a latch mechanism which may be rendered operative or inoperative by having one element of the coupling device enclosed inside the spindle projected or retracted through an opening provided on the cylindrical wall of the spindle to be engaged with or detached from the other element of the coupling device and which, because of the abovementioned construction, is not subject to destruction readily from the outside.

Another object of the present invention is to provide a latch mechanism so made that the lock members are accommodated inside the spindle and hence the knob free from the external force need not be constructed with rigidity and is intended only as an aid for operation of the lock.

Other objects of the present invention will become apparent from the following detailed description of the invention made with reference to the accompanying drawings showing an embodiment thereof.

*Detailed description of the invention*

Figure 1:
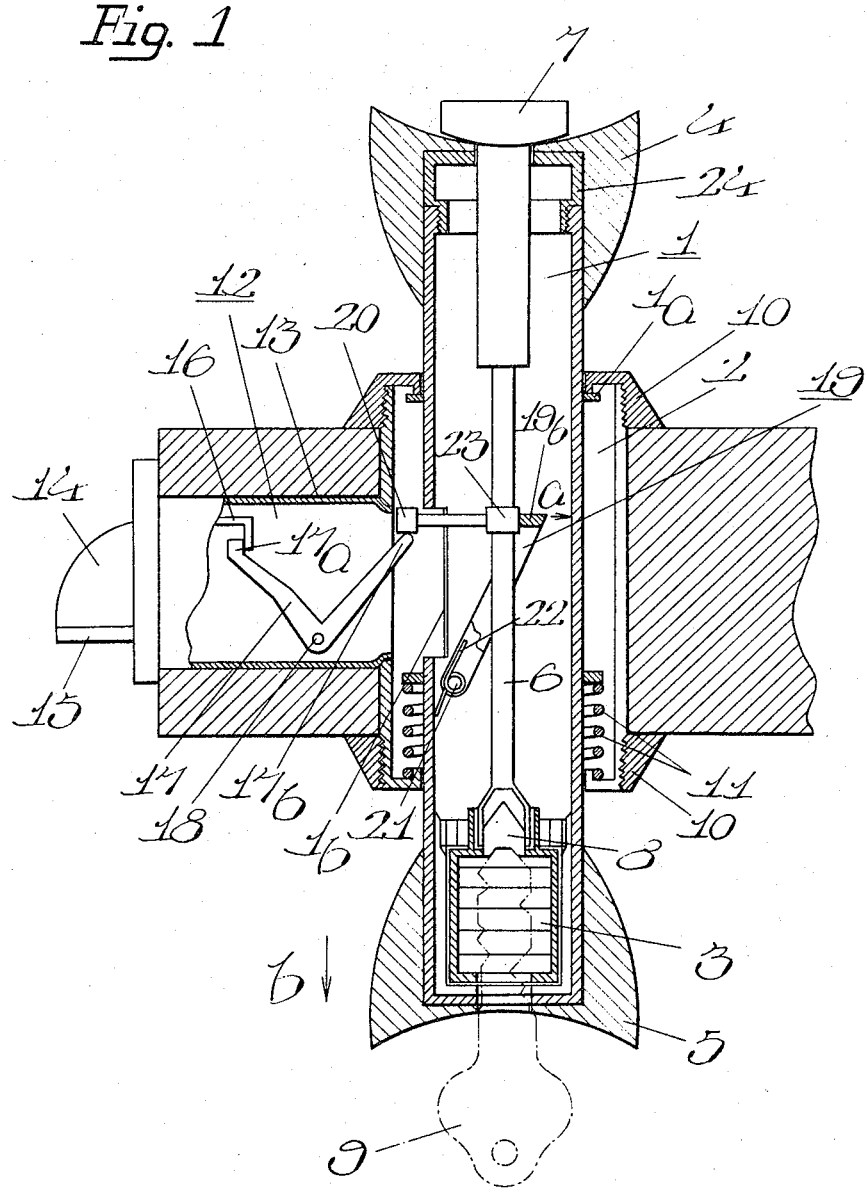
FIG. 1 is a sectional view showing an embodiment of the lock of the present invention as fitted to the door.
Figure 2:
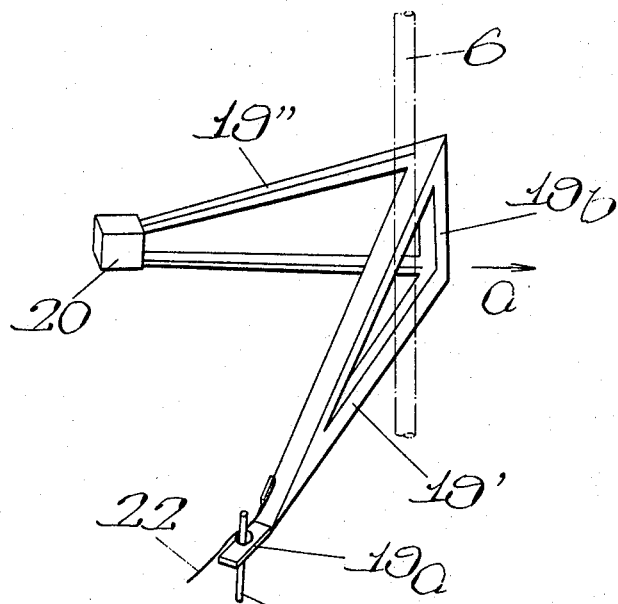
FIG. 2 is a perspective view of a coupling lever fitted in the lock.
Figure 3:
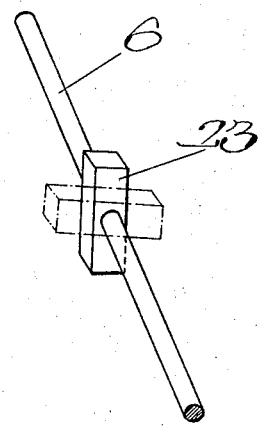
FIG. 3 is a perspective view of a cam mounted to an actuating rod fitted in the lock.

Referring to FIGS. 1 to 3, a hollow spindle 1 is insertedly fitted about is central portion into a cylindrical casing 2 in such manner that the same is slidable longitudinally of said casing but its rotary motion relative to said casing is retarded (this may be effected by having a key projectedly fitted to the spindle inserted into a guide groove perforated longitudinally of the cylindrical casing 2). A cylinder 3 of the known type is insertedly fitted inside the one end of the spindle 1. Knobs 4, 5 made from metal, wood, plastics or other material are secured to both ends of the spindle 1. An actuating rod 6 extending through the center of the spindle 1 has its one end secured to a dial 7 and its other end to a tail member 8 provided to the cylinder 3. Said actuating rod 6 is arranged to be turned axially with rotation of dial 7 or with rotation of a key 9 inserted into a keyway of the cylinder 3. Seat plates 10, 10 are adapted to engage with the door tightly from the opposite sides thereof. In the embodiment as illustrated, knob 5 is located outside of and, knob 4 is located inside of the door. Spring 11 is secured at one end to the cylindrical casing 2 and at the other end to the spindle 1 so as to urge the spindle 1 in an upward direction. A stopper 1a is operative to prevent spindle from sliding outwards upwardly under the influence of spring 11. A latch actuating member 12 is located inside the cylindrical member 13 insertedly fitted and secured to said cylindrical casing 2 normal to its cylindrical surface. Numeral 14 designates a latch to engage with door socket, and numeral 15 its trigger bolt. In a known manner, when the door is closed, latch 14 fits into an opening on the door socket while trigger bolt 15 is retracted by a striker provided on the socket, and a device is provided for returning said latch 14 and trigger bolt 15 to their former positions. A pull-bar 16 connected to the latch is bent at its foremost part to engage with the bent portion 17a of an L-shaped lever 17 arranged to be turned in the vertical direction with axis 18 as its pivot and its foremost end 17b faces to the underside of a depressing member 20 of the coupling lever 19 to be described later. Coupling lever 19 has the shape of two equilateral triangular bars 19', 19" connected at their bases, each of said equilateral triangular bars bored at its central portion as shown in FIG. 2. Triangular bar 19' is mounted to the spindle 1 by a shaft 21 at its apex portion while the other triangular bar 19" is provided at its apex portion with depressing member 20. Spring 22 wound about shaft 21 has its one end engaged with spindle 1 and its other end with the apex portion 19a of the triangular bar 19' and is operative to return the coupling lever 19 to its former position as it is turned pivotally about shaft 21. A rectangular rotatable piece 23 secured to said actuating rod 6 abuts lengthwise on the inner face of an upright member 19b of the coupling lever 19 constituted by the bases of the triangular bars 19', 19".

As the actuating rod 6 is turned through 90°, said piece 23 is leveled as shown by the dotted line of FIG. 3 and its foremost end presses the inner face of the upright member of the coupling lever 19 to cause the coupling lever to be displaced laterally or in the direction as indicated by the arrow a in its entirety with shaft 21 as its pivot. On the other hand, when the lock is opened, the foremost end of the L-shaped lever 17 faces at all times to the lower surface of the depressing member 20 of the coupling lever 19 (it is not essential that said end 17 and member 20 should be in actual contact with each other). Depressing member 20 is projected laterally outwardly via the upper part of an oblong hole 1b bored on the cylindrical surface of the spindle 1 at a location corresponding to the latch actuating member 12, the arrangement being such that depressing member 20 is operative to depress the foremost end of the L-shaped lever as the spindle 1 is pulled in the direction as indicated by the arrow b by operation of knob 5.

Numeral 24 designates a cover threadedly fitted to the spindle 1 and components of the lock such as cylinder 3 and actuating rod 6 are fitted in position with this cover 24 detached from the spindle.

With the above construction of the present invention, it will be seen that the door closed by operation of the knob 4 or 5 may be opened by pulling knob 5 on the outside of the door or by pressing knob 4 towards the door to cause spindle 1 to be displaced outwardly of the door or in the direction of the arrow b since, by such operation, the actuating rod 6 and coupling lever 19 are lowered and the depressing member 20 of the coupling lever 19 is operated to depress the foremost end 17b of the L-shaped lever 17 with axis 18 as its pivot, so that the bent edge 17a on the opposite end of lever 17 pulls lever 16 connected to the latch 14 to retract the latter and the latch may be disengaged from the door socket. When the force exerted to the knob 4 or 5 is released, spindle 1 is returned to its former position under the influence of the spring 11, while the latch is returned by the restitution of the spring enclosed therein and L-shaped lever 17 is also returned. When closing the lock, key 9 is inserted in the keyway of the cylinder 3 and turned to rotate the actuating rod 6 through 90° and to level cam 23 as indicated by the dotted line of FIG. 3. By this operation, coupling rod 19 is moved in the direction indicated by the arrow a by engagement of its upright member 19b with the cam 23 and the depressing member is thus moved away from the foremost part 17b of the L-shaped lever 17. Even if spindle 1 is moved in the above-mentioned manner, against the force of spring 11, L-shaped lever 17 itself is not free to turn pivotally and hence the latch 14 may not be retracted. When opening the lock, if key 5 inserted in the keyway is turned coupling lever 19 together with actuating rod 6 is returned under the influence of the spring 22 to position the depressing member 20 right above the foremost part 17b of the L-shaped lever 17, so the lock may be opened by operating the knob to displace spindle 1. It is to be noted that by rotation of dial 7 operation for opening and closing the lock is performable from inside of the door in the same way as by turning key 9 in the keyway.

Since the latch mechanism according to the present invention has the above-mentioned construction wherein the spindle itself is constructed sturdily and the lock members such as cylinder are accommodated inside the spindle, in a manner distinct from the conventional device lock members are not affected in the least even if the knob is destructed from outside. Thus there is no fear that the lock is opened by destruction of the knob as was the case with the conventional device. Moreover, the mechanism for opening and closing the lock is simple, while the knobs may be manufactured from wood, metal or plastics to suit the interior ornaments.

What is claimed is:

1. A latch mechanism comprising a hollow spindle, an actuating rod having a cam positioned thereon provided inside said spindle to extend longitudinally of said spindle, a latch, and a coupling device provided intermediate said actuating rod and the latch and including an element following said cam of the actuating rod, characterized in that said element is adapted to be projected outwardly through an opening provided on the cylindrical wall of the spindle by operation of said actuating rod to an operative position for engaging said coupling device to release the latch, and receded inside the spindle through said opening by operation of said actuating rod to keep said coupling device disengaged and to prevent the latch from opening.

2. A latch mechanism as claimed in claim 1, in which said actuating rod has its one end extending outwardly from one end of the spindle and its other end engageable by a lock member housed inside the opposite end of the spindle, said actuating rod being operable by direct manipulation of the end thereof extending outwardly from the spindle or by manipulation of the other end thereof through said lock.

3. A latch mechanism as claimed in claim 1 wherein said coupling device comprises a lever connected at its one end to the latch and facing said spindle at its other end over the opening of the spindle, and said element normally contacting at its one end with said other end of the lever and being engageable at its other end with the cam of the actuating rod.

4. A latch mechanism as claimed in claim 1 further comprising knobs fixed to both ends of the spindle, one of said knobs having a hole communicating to a keyway provided to the lock member housed inside the spindle.

References Cited

UNITED STATES PATENTS 1,732,433  10/1929  Darlington _____ 70—149
2,650,123  8/1953  Hopgood _____ 292—169

FOREIGN PATENTS 637,675  5/1950  Great Britain.

MARVIN A. CHAMPION, *Primary Examiner.*

EDWARD J. McCARTHY, *Assistant Examiner.*

U.S. Cl. X.R.

292—169